United States Patent [19]

Bertschi

[11] 4,299,067
[45] Nov. 10, 1981

[54] PARTITION CONNECTOR SYSTEM

[75] Inventor: Hans G. Bertschi, Upper Montclair, N.J.

[73] Assignee: J. C. Penney Company, Inc., New York, N.Y.

[21] Appl. No.: 89,395

[22] Filed: Oct. 30, 1979

[51] Int. Cl.³ .............................................. E04C 1/10
[52] U.S. Cl. ...................................... 52/127; 52/285; 52/584; 403/296; 403/409
[58] Field of Search .................. 52/127, 285, 584; 403/6-9, 296, 292, 409

[56] References Cited

U.S. PATENT DOCUMENTS

| | | | |
|---|---|---|---|
| 2,389,899 | 11/1945 | Deddo | 403/296 X |
| 3,310,919 | 3/1967 | Brue et al. | 52/127 |
| 3,537,736 | 11/1970 | Kroopp | 52/584 X |
| 3,872,642 | 3/1975 | Felix | 52/584 X |
| 3,884,002 | 5/1975 | Logie | 52/584 X |
| 4,012,880 | 3/1977 | Logie | 52/127 X |
| 4,045,927 | 9/1977 | Diaz | 52/584 X |
| 4,116,573 | 9/1978 | Fuchs | 403/409 X |

FOREIGN PATENT DOCUMENTS

| | | | |
|---|---|---|---|
| 580761 | 10/1976 | Switzerland | 52/584 |
| 784302 | 10/1957 | United Kingdom | 52/127 |

*Primary Examiner*—Alfred C. Perham
*Attorney, Agent, or Firm*—Daniel N. Calder

[57] ABSTRACT

A system for connecting wall partitions or panels together wherein sets of two cross-drilled blind holes are formed in the ends of the partitions to be joined, one hole being of smaller diameter and opening on the end surface of the partition and the other hole of larger diameter opening on one of the side faces. The connector hardware involves three basic parts including a cylindrical plug member, in the larger diameter hole and has a threaded axial bore in one end and a communicating cross bore toward the other end, which bore also communicates with the smaller diameter hole. A second cylindrical connector member, is closely accommodated in the smaller diameter hole and in the cross bore of the plug member, and has a threaded axial bore in one end and a tapered groove or waist portion along its length. The third connector part constitutes a screw member that is adapted to be screwed into the axial bores in each of the cylindrical members. The screw member bridges the partition end surfaces when screwed into the axial bores in cooperating connector members in each partition and is provided with a cone point which, when the screw member is screwed, cooperates with the waist portion of the connector member in the cross bore to produce a camming action therebetween. This camming action draws together the respective end surfaces of the two partitions containing the cooperating sets of connector points.

15 Claims, 10 Drawing Figures

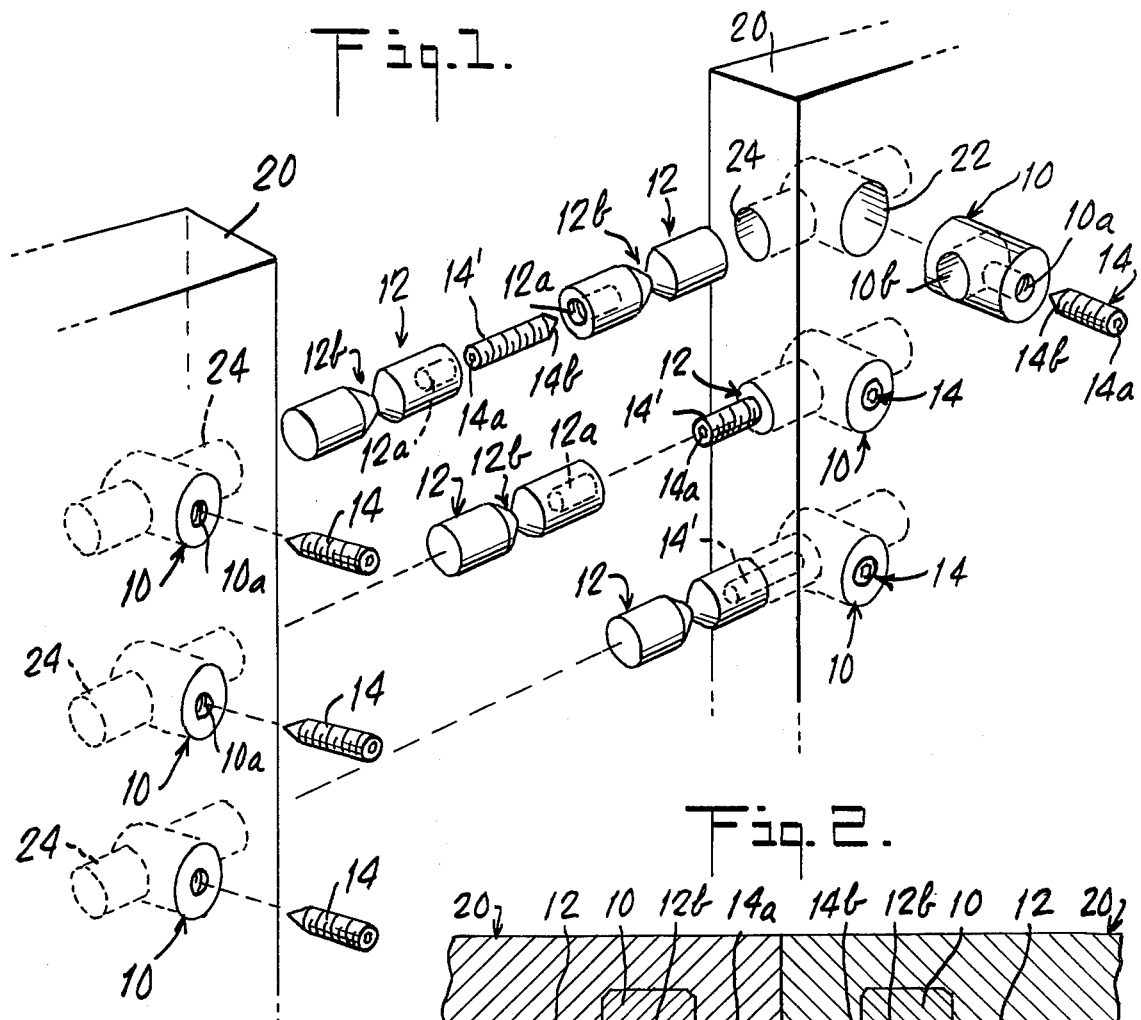
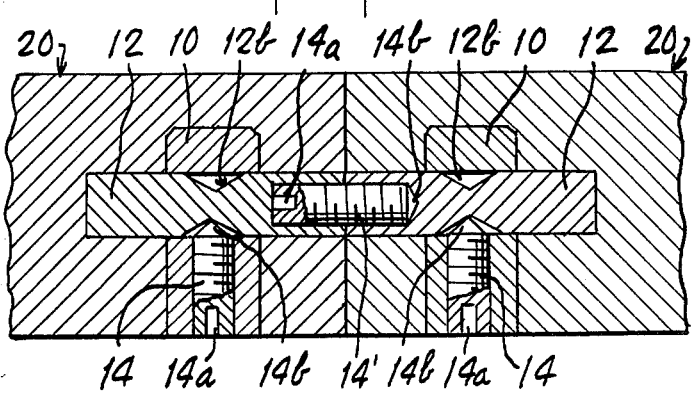
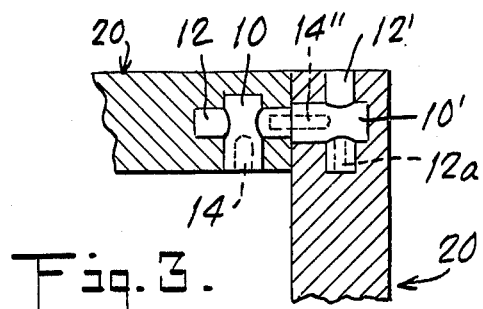
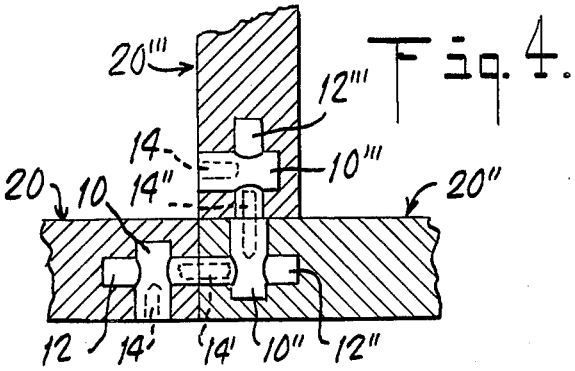

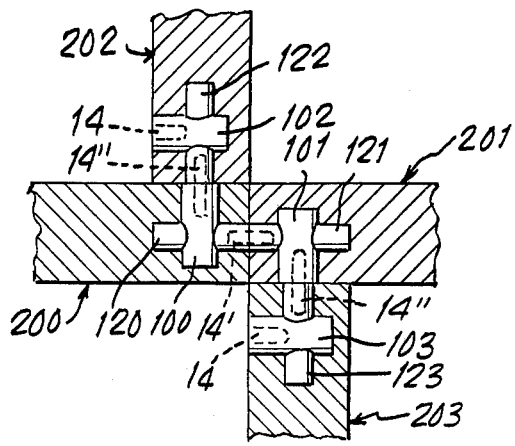
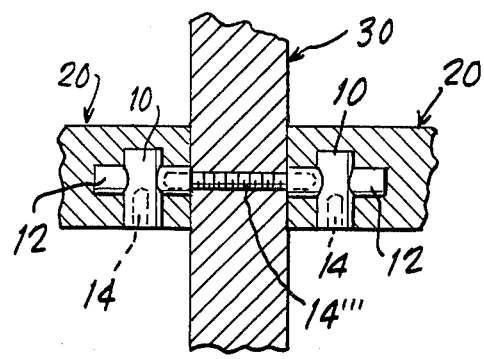
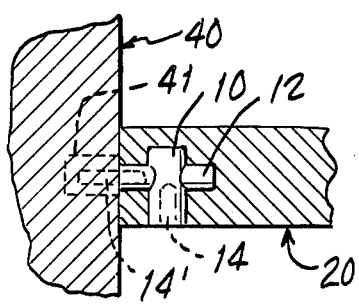
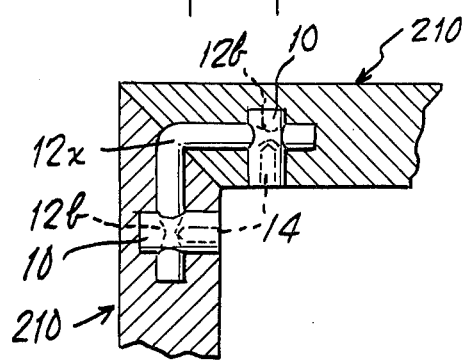
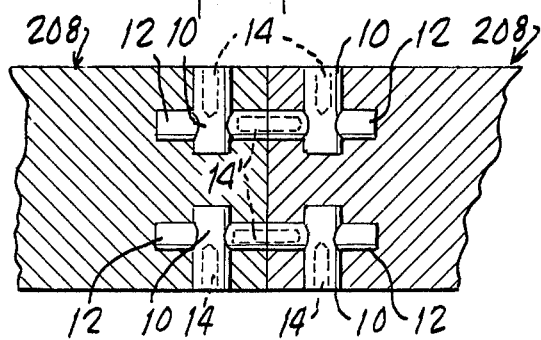
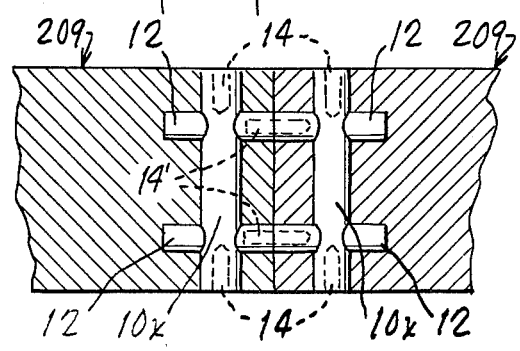

4,299,067

PARTITION CONNECTOR SYSTEM

BACKGROUND OF THE INVENTION

The present invention relates to a fastening system for joining the ends of two or more members and particularly to a system for connecting wall partitions or panels together with a simplified combination of hardward and drilled holes.

Partition connecting systems are known, such as shown in U.S. Pat. No. 3,884,002 to Charles Logie, wherein blind holes are cross drilled in the ends of the partitions and cooperating interconnected hardward parts therein are screwed together drawing the end surfaces of the partitions into abutment by means of a camming action. In this particular teaching, a connecting pin member is used to bridge the two partitions to be joined and has two cross bores therein, one positioned in each partition and each threaded to cooperate with threaded pin or bolts having tapered heads that are inserted through slightly oversized counter-sunk holes formed in one side face of each of the partitions. The camming action is produced by arranging the centers of the two bores to be spaced slightly closer together than the centers of the countersunk holes when the partition end surfaces are abutting so that as the threaded bolts are screwed into the bores, their tapered heads act against the sides of the countersunk holes displacing and wedging the partition ends tightly together. A potential problem with this type of camming arrangement is the fact that if the partitions are of ordinary wood or plastic, or similar comparatively soft material, repeated use of the connecting devices will tend to round or distort the countersunk holes so that tight engagement of the partition ends may not be continuously achieved.

This problem is avoided by a somewhat similar wall connecting system shown in U.S. Pat. No. 4,045,927 to Diaz wherein a connecting plate is used to achieve the desired camming action. In this system two brackets of complicated construction are mounted on the ends of the partition walls to be connected and have slots therein for accommodating the connecting plate which has two countersunk holes in the opposite ends thereof. Studs or bolts having screw-threaded ends are passed through openings in the brackets and through the cooperating countersunk holes in the plate and have intermediate tapered parts which when they are screwed into position act against the countersunk portions of the bracket holes to produce a camming action that pulls the walls together. While solving the bore hole deformation problem, this system requires complicated hardware and extensive cutting to attach the hardware to the partitions and is of limited versatility in achieving different combinations of panel connections.

The present invention improves upon partition connecting systems of the above-noted types by providing a simple effective and versatile arrangement of parts and bores requiring a minimum of expense and labor in construction and use.

SUMMARY OF THE INVENTION

The connector system of the present invention involves a basic parts assembly requiring only three different types of cooperating connector parts which are insertable into two cross drilled blind holes in the ends of each of the partitions or panels to be joined and which cooperate when screwed together to tightly hold the partition ends together. The two blind holes may be drilled into the material of the partition and are of different diameters, the smaller hole opening on the end surface of the partition and the larger hole opening on one of the side faces. One of the connector parts, all of which may be machined from metal or another hard substance, is in the form of a cylindrical plug member which snugly fits into the blind hole opening on the side face of the partition. This plug member has a threaded axial bore in one end and a smooth cross bore toward the other end that communicates with the axial bore and with the smaller diameter hole when the plug member is fully inserted in the larger diameter hole. A second connector part is in the form of a cylindrical connector member which is snugly accommodated in the smaller diameter hole and in the cross bore of the plug member when both are fully inserted in the respective holes. This connector member has a threaded axial bore in one end and a tapered groove or waist portion along its length that is positioned adjacent the axial bore opening within the cross bore in the plug member when the two parts are fully disposed in the partition holes.

The third type of connector part constitutes a screw member that is adapted to be screwed into the axial bores in each of the cylindrical members. The screw member may be made in different lengths to adapt it to various applications and has a recess or socket in one end which accepts a tool for rotating it when it is screwed into or out of the threaded axial bores in the cylindrical members. The opposite end of the screw member is provided with a cone point that cooperates with the waist portion of the connector member to produce a camming action therebetween when the screw member is screwed fully into the axial bore in the plug member. The combination of the cone point and recess in its opposite ends permits the outside diameter of the screw member to be made uniform so that either of its ends can be accepted in the threaded bores of the cylindrical members facilitating the joining of the members together.

A preferred embodiment of the system of the present invention for joining two partition ends actually involves seven separate connector parts to complete a unit assembly, that is, two plug members, two connector members, two camming set screws, and a longer partition bridging screw. The partition joint is assembled by firstly inserting a plug member in a larger diameter hole in one partition and then inserting a connector member in the smaller diameter hole with its waist portion disposed in the cross bore in the plug member. These two cylindrical members, with their axial bore ends flush with the partition surfaces, are then fastened together by screwing a set screw into the axial bore in the plug member until its cone point engages the waist portion of the connector member. A bridging screw is then screwed into the axial bore in the connector member leaving a portion of the screw extending outwardly from the partition end surface. Another connector member is then screwed onto the outwardly extending portion of the bridging screw until it engages the end surface of the partition, and the assembled combination is then ready for joining to the other partition. Another plug member is inserted in the larger diameter hole in the cooperating cross-bored holes in the other partition, and the connector member extending from the end face of the first partition is inserted into the smaller diameter hole until the partition end faces are brought into abutment whereupon the dimensioning of the parts will result in the waist portion of the received connector member being disposed within the cross bore of the second plug member. A second set screw is then screwed into the axial bore in the second plug member so that its cone point cams against the waist portion of the received connector member drawing it further into the hole and pressing the end faces of the two partitions tightly together. In the usual situation a number of these unit assemblies will be used along the partition joint.

With the two partitions so joined, all of the seven connector parts in all of the assemblies are disposed within the partitions with no members extending in any manner outwardly from any of the exposed surfaces. The camming action drawing the members together occurs between two metallic or other hard material parts so that the stresses in the system are such as to minimize any deformation of the holes in the softer partition material through frequent assembly and disassembly and, in fact, the parts arrangement minimizes the danger of any other damage to the panel surfaces during assembly and disassembly.

The manufacture of the connector system of the present invention requires the production of only three fundamental parts, the plug member, the connector member and the screw member, and these parts can be used in may different combinations to connect two or more partitions to each other and to other structures. Further, the system only requires the drilling of simple holes in the partitions without threading so that they can be readily formed in the partition ends at an installation site without the need for any extraordinary tools. The present invention accordingly provides a simple, improved, effective and versatile partition connecting assembly superior to those of the prior art.

BRIEF DESCRIPTION OF THE DRAWINGS

FIG. 1 is a perspective view showing the ends of two partitions to be joined and illustrating the parts and steps in assembling a preferred embodiment of the present invention.

FIG. 2 is a top view in section illustrating the assembled parts forming a straight connection between the two partition end surfaces of FIG. 1.

FIG. 3 is a top view diagrammatically illustrating a corner connection of two partitions using the system of the present invention.

FIG. 4 is a top view diagrammatically illustrating a T connection of three partitions in accordance with the present invention.

FIG. 5 is a top view diagrammatically illustrating a cross connection of four partitions using the system of the present invention.

FIG. 6 is a top view diagrammatically illustrating a cross connection using a modified screw member in accordance with the present invention.

FIG. 7 is a top view diagrammatically illustrating a modified system of the present invention for securing a panel end surface to a structural wall.

FIG. 8 is a top view diagrammatically illustrating the use of the present invention in connection with a straight connection of the end surfaces of two wide partition members.

FIG. 9 is a top view diagrammatically illustrating a modification of the embodiment shown in FIG. 8.

FIG. 10 is a top view diagrammatically illustrating a further modified embodiment of the present invention for use with a corner connection of the mitered ends of the two partition members.

DETAILED DESCRIPTION OF THE INVENTION

A preferred embodiment of the present invention is illustrated in FIG. 1 wherein the relationship between the parts of an assembly set having seven cooperating parts is shown in various stages of assembly with respect to the ends of two partitions or panels to be abutted in a straight connection. FIG. 2 is a view in section showing the relationship of one set of connector parts and the panel ends when the assembly is completed.

More particularly, it will be seen that a unit connector assembly comprises three different types of parts, namely, a cylindrical plug member 10, a cylindrical connector member 12, and a screw member 14. Each cylindrical plug member 10 has a threaded axial bore 10a in one end and a cross bore 10b toward its other end with the axial bore 10a opening into one side of the cross bore 10b. The cross bore 10b has a smooth inner surface and is of a larger diameter than the thread axial bore 10a.

The cylindrical connector member 12 has an outside diameter dimensioned to permit it to be accommodated in the cross bores 10b of the plug members 10 and is also provided with a threaded axial bore 12a at one end. The connector member 12 is also provided with a groove or waist portion 12b in its outer surface along its length, preferably at midlength. When the connector member 12 is inserted in a plug member cross bore 10b the waist portion 12b will generally register with the threaded axial bore 10a in the plug member 10 as shown in FIG. 2.

The screw member 14 is threaded on its other surface and dimensioned to screw into each of the axial bores 10a, 12a in the plug member 10 and connector member 12. The screw member 14 has a recess or socket 14a at one end for accepting a tool for rotating it to advance or remove it from the threaded bores. The other end of the screw member 14 is provided with a cone head 14b which, upon the screwing of the member 14 into an axial bore 10a in a plug member 10 when a connector member 12 is accommodated therein, will cam against the surface of the waist portion 12b. The connector parts may be dimensioned so that the screw members are all of uniform length, or screw members of different length may be used in different applications, as will be more fully described. In the embodiment illustrated in FIGS. 1 and 2 the screw member 14' for connecting two connector members 12 may be somewhat longer than the screw members 14 for camming and setting a connector member 12 in a plug member 10. In any event, it will be seen that the combination of the recess 14a and cone head 14b on the opposite ends permits the outside diameter of the screw member to be made uniform, so that either of its ends can be accepted in the threaded bores 10a, 12a in the cylindrical members.

The partitions, panels or other structural members 20 to be joined by the connector assembly are provided with one or more sets of cross-drilled holes in their ends as shown in FIG. 1. As shown each set of holes comprises a large diameter hole 22 opening on the side face of the partition and of a diameter to snugly accommodate a plug member 10 therein. The hole 22 will be of sufficient depth to accept a plug member 10 until its end face is flush with the side surface of the partition 20. The other hole 24 of the set opens on the end surface of the partition and has a diameter which will snugly accept a connector member 12 therein. This hole 24 will similarly have sufficient depth to accept a connector member 12 until its end face is flush with the end surface of the partition. The two holes 22, 24 will communicate with each other in such a manner that a connector member 12 may be passed through the cross bore 10b in a plug member 10 when the two members are fully inserted in the holes as shown in FIG. 2. Since these holes 22, 24 are simply and readily formed by drilling, requiring no threading or cutting, the connector assembly of the present invention may be adapted for use in existing installations as well as with pre-prepared partitions and structural members.

The versatility of the connector assembly in forming various partition joint arrangements and connections is illustrated in the remaining figures along with certain modifications of the assembly. FIG. 3 shows the manner in which a corner connection of two partitions can be made using the preferred unit assembly of seven parts. In this configuration the bridging screw 14″ connects a plug member 10′ in the side of one partition 20′ with a connector member 12 in the end of another partition 20. It will be seen that with this arrangement the camming action of set screw 14 on the waist portion of the connector member 12 in the partition 20 will draw the abutting surfaces of the two partitions tightly together. As a second set screw is not necessary in this instance, the connector member 12′ in the partition 20′ may be inserted with its bored end contained within the drilled hole so that the end surface of the partition will be smooth and uninterrupted.

The versatility of the preferred embodiment is further illustrated by the T-connection of three partitions shown in FIG. 4. It will be seen that each of the partition ends, as in the embodiments shown in FIGS. 1–3, is fitted with a plug member and connector member in the cross-bored holes. The bridging screw 14′ connecting the two partitions 20, 20″, whose end surfaces are abutting, is screwed into two connector members 12, 12″, while the bridging screw 14″ connecting the end surface of the partition 20‴ to the side surface of partition 20″ is screwed into the plug member 10″ in the latter partition 20″ and the connector member 12‴ in the former partition 20‴. Again, in this arrangement the set screws 14 will press the abutting surfaces together by virtue of their camming action on the waist portions of the respective connector members 12, 12‴.

FIG. 5 shows the manner in which a cross connection of four partitions may be arranged. The bridging screw 14′ between the abutting end surfaces of the coplanar partitions 200, 201 joins the connector members 120, 121, while the bridging screws 14″ connecting the end surfaces of the other two partitions 202, 203 to the side surfaces of the coplanar partitions 200, 201 join the plug members 100, 101 in the coplanar partitions to connector members 122, 123 in the other two partitions 202, 203. In this arrangement it will be seen that one of the latter bridging screws 14″ will also act as a camming set screw drawing the end surfaces of the coplanar partitions 200, 201 together during the assembly of the connections.

FIG. 6 shows a modification of the present invention which adapts the preferred embodiment to produce a cross connection wherein the end surfaces of two coplanar partitions 20 abut the opposite side surfaces of a transversely disposed partition 30. The transversely disposed partition 30 is merely drilled through to produce a cross hole 30′ of a diameter for accommodating an elongated bridging screw 14‴. Screw 14‴ may be of identical construction to set screws 14 and bridging screws 14′ except that it will be cut to a longer length. It will be seen that either of the set screws 14 in this arrangement will, by its camming action on its respective connector member, draw the end surfaces of the coplanar partitions 20 tightly against the side surfaces of the transverse partition 30.

FIG. 7 illustrates another adaptation of the present invention for securing a partition end surface to a structural wall 40. The structural wall 40 may be fitted with a threaded anchor 41 which will accommodate a bridging screw 14′. The connector member 12 may be screwed onto the end of the bridging screw left extending from the anchor 41 and then the end surface of the partition 20 may be pressed against the structural wall 40 such that the connector member 12 passes into the smaller diameter hole and through the cross bore in the plug member 10. Screwing of the set screw 14 into the plug member 10 then tightens the joint by virtue of the camming action.

FIGS. 8 and 9 show further adaptations of the system of the present invention for joining thick partitions. For applications wherein the partitions may be of a double thickness or larger, or if for some reason it is desirable to make the connector assembly of smaller dimensions as compared to the partitions, the ends of each of the partitions 208 may be fitted with two connector assemblies such as shown in FIG. 8. Alternatively, as shown in FIG. 9, the larger diameter holes may be drilled completely through the partitions 209 from one side face to the other and the plug members modified to the form 10x extending the full width of the partitions with the appropriate axial bores and cooperating cross bores formed at either end. The remaining parts of the assembly, that is, the connector members 12, set screws 14, and bridging screws 14′ may be of the same construction and size as those of the preferred embodiment.

A further modification of the present invention to adapt it for connecting partitions 210 with mitered corners is shown in FIG. 10. In this embodiment it will be seen that the small diameter hole in the mitered end surfaces of the partitions 210 are longer than in the rectangular ended partitions 20 and accommodate a 90° connector member 12x which is formed with waist portions 12b on its opposite ends. The ends of the connector 12x will be disposed in the cross bores in the plug members 10 when the mitered ends of the partitions 210 are brought together, and a tightly secured joint is then formed by screwing set screws 14 into the axial bores in the plug members 10 until the waist portions of connectors 12x are engaged to produce the necessary camming action.

By way of example, suitable dimensions for the parts of the preferred embodiment when used with conventional 2 inch width partitions may be as follows:

Plug member 10 may have an outside diameter of ⅝ inch and a length of 1⅜ inches. Its axial bore may have a diameter of 5/16 inch and its cross bore a diameter of 7/16 inch. The distance from the center line of the cross bore to the axial bore face will be ⅜ inch, the depth of the axial bore being ¾ inch.

The set screw will have an outside diameter of 5/16 inch to be accommodated in the axial bore in the plug member 10 and have a length of ¾ inch. The angle of the cone head may be 118°.

Connector member 12 will have an outside diameter of 7/16 inch for passing through the cross bore in plug member 10 and a length of 1¾ inches. The distance from the axial bore face to the center of the waist portion may be ⅞ inch, and the angle between the surfaces of the waist portion will be 120°, thus accommodating the cone point on set screw 14. The axial bore 12a will similarly have a diameter of 5/16 inch, to accommodate either a set screw 14 or a bridging screw 14', and have a depth of ¾ inch to fully accommodate a set screw.

The bridging screw 14', as noted, will have an outside diameter of 5/16 inch and may be of a length of 1¼ inches. Its cone point may have the same angle 118° as the set screw. Both screws will have a pitch of 18 per inch. The modified bridging screw 14''' shown in FIG. 6 will be of a 3 inch length sufficient to traverse partition 30 and have its ends adequately received in the axial bores in the connector members 12.

The modified plug member 10x shown in FIG. 9 will similarly be of sufficient length to traverse the double width partition in which it is inserted, that is, 4 inches, and the 90° connector member of FIG. 10 will have its right angled central portion dimensioned to permit the joining of the mitered ends of the partitions.

While the connector member, and the plug member and its cross bore, are preferably circular in cross section, the shapes of these members, as well as the accommodating holes in the partition, may be varied and the desired results still be achieved. For example, the connector member and cross bore may be square in cross section and the head of the set screw may be in the form of a cup point for engaging a shape edge on the connector member waist portion to produce the camming action. Other and further modifications of the parts of the present invention will become apparent to those skilled in the art in the light of the foregoing description and be within the spirit and scope of the invention.

What is claimed is:

1. Apparatus for connecting two structural members at least one of which has an end face and two side faces, comprising:
    first means, mounted in the end face of said one structural member, for connecting said one structural member to a second structural member, said first means comprising:
        a connector member disposed in said end face and having an axial bore in one end and a waist portion in its outer surface; and
        bridging means, held in said axial bore for connecting said connector member to said second structural member;
    second means, mounted in one side face of said one structural member, for holding said connector member in said end face and comprising:
        a plug member having an axial bore in one end and cross-bore means for receiving said connector member therein, said axial bore communicating with said cross-bore means, and said waist portion of said connector means registering with said axial bore in said plug member; and
        set screw means, disposed in said axial bore in said plug member for engaging and holding said connector member in said plug member.

2. Apparatus as in claim 1 wherein said set means has head means thereon for engaging said waist portion.

3. Apparatus as in claim 1 wherein said bridging means and said set means comprise cylindrical members having threaded outer surfaces and said axial bores in said connector and plug members comprise threaded means for cooperating with said threaded outer surfaces to hold said bridging means and said set means in said bores.

4. Apparatus as in claim 3 wherein said set means further comprises cone head means on one end for engaging and camming against said waist portion.

5. Apparatus as in claim 3 wherein said respective threaded means in said axial bores in said connector and plug members comprise means for cooperating with either of said threaded outer surfaces of said briding means and said set means to hold said means in said members.

6. Apparatus for joining two or more partitions, at least one of which is provided with two cross-bored holes therein, comprising the combination of:
    a plug member disposed in one of said cross-bored holes, and having an axial bore in one end and a cross bore communicating with said axial bore and registering with said other cross-bored hole in said one partition;
    connector means for connecting said one partition to a second partition, said connector means being disposed in said other cross-bored hole and passing through said cross bore in said plug member, and having a waist portion in its outer surface which substantially registers with said axial bore in said plug member; and
    means, disposed in said axial bore in said plug member, for engaging and camming against said waist portion in said connector means to firmly hold said connector means in said other cross-bored hole.

7. Apparatus as in claim 6 wherein said connector means further comprises means for bridging said one partition and said second partition and connected to said second partition.

8. Apparatus as in claim 7 wherein said connector means has a threaded axial bore in one end and said bridging means comprises a bridging screw having one end screwed into said axial bore in said connector means and its other end connected to said second partition.

9. Apparatus as in claim 8 wherein said axial bore in said plug member is threaded and said axial bores in said plug member and said connector means both threadedly accommodate both of said engaging and camming means and said bridging screw to hold them therein.

10. Apparatus as in claim 9 wherein both said engaging and camming means and said bridging screw have cone head means on one end for camming against the waist portion on said connector member to draw said partitions tightly together.

11. Apparatus for joining two or more partitions, at least one of which is provided with two cross-bored holes in adjacent faces thereof, comprising the combination of:
    a plug member dimensioned to closely fit in one of said cross-bored holes, and having a threaded axial bore in one end and a cross bore communicating with said axial bore and registering with the other cross-bored hole when positioned in said one cross-bored hole in said one partition;
    a connector member, dimensioned to closely fit in said other cross-bored hole and to pass through said cross bore in said plug member when it is positioned in said one cross-bored hole, and having a threaded axial bore in one end and a waist portion in its outer surface which substantially registers with said axial bore in said plug member when so disposed in said cross bore; and screw means, dimensioned to screw into each of said axial bores, for bridging and connecting said one partition to a second partition, and having cone head means on one end for camming against the waist portion in said connector member when screwed into the axial bore in said plug member to draw said partitions tightly together.

12. Apparatus for connecting two structural members at least one of which has an end face and two side faces, comprising:
- a connector member adapted to be disposed in said end face of said one structural member, said connector member having an axial bore in one end thereof and a waist portion in its outer surface;
- bridging means constructed to be held in said axial bore for connecting said connector member to said other structural member;
- a plug member adapted to be disposed in one side face of said one structural member, said plug member having an axial bore in one end thereof and crossbore means communicating with said axial bore for receiving said connector member therein such that said waist portion being capable of registering with said axial bore; and
- set means constructed to be disposed in said axial bore in said plug member for engaging and holding said connector member in said plug member.

13. Apparatus as in claim 12 wherein said bridging means and said set means are screw-like in structure.

14. A disconnectable partition assembly comprising:
- at least one partition member having two adjacent faces with holes formed in each, which holes communicate with each other in the partition interior;
- a plug member disposed in one of said holes and having an axial bore in one end and a cross bore communicating with said axial bore and registering with the other hole in said one partition;
- a connector member disposed in said other hole and passing through said cross bore in said plug member and having an axial bore in one end and a waist portion in its outer surface which substantially registers with said axial bore in said plug member;
- a second partition member having a face with at least one opening formed therein;
- holding means received and held in said axial bore in said connector member and in said opening for bridging and connecting said one partition to said second partition and
- setting means received and held in said axial bore in said plug member for camming against the waist portion of said connector member to draw said partition members tightly together.

15. An assembly as in claim 14 wherein said holding means and said setting means have threaded outer surfaces and said axial bores have threads cooperating with said threaded outer surfaces to hold said holding means and setting means therein.

* * * * *